(12) United States Patent
Sawai

(10) Patent No.: US 8,250,422 B2
(45) Date of Patent: Aug. 21, 2012

(54) RECEIVING DEVICE, RECEIVING METHOD, PROGRAM AND WIRELESS COMMUNICATION SYSTEM

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 12/558,727

(22) Filed: Sep. 14, 2009

(65) Prior Publication Data
US 2010/0095180 A1    Apr. 15, 2010

(30) Foreign Application Priority Data
Oct. 10, 2008    (JP) ................. 2008-264109

(51) Int. Cl.
G06F 11/00    (2006.01)
G06F 11/30    (2006.01)
G08C 25/00    (2006.01)
H03M 13/00    (2006.01)
H04L 1/00    (2006.01)

(52) U.S. Cl. ...................................... 714/746

(58) Field of Classification Search .............. 714/746, 714/795, 799; 375/262, 341
See application file for complete search history.

(56) References Cited

U.S. PATENT DOCUMENTS

| | | | |
|---|---|---|---|
| 5,708,971 A * | 1/1998 | Dent | 340/7.22 |
| 7,907,689 B2 * | 3/2011 | Walton et al. | 375/347 |
| 7,991,065 B2 * | 8/2011 | Wallace et al. | 375/267 |
| 2005/0141631 A1 | 6/2005 | Takano | |
| 2009/0310695 A1 * | 12/2009 | Sawai | 375/262 |
| 2010/0111157 A1 * | 5/2010 | Sawai | 375/232 |

FOREIGN PATENT DOCUMENTS

| | | |
|---|---|---|
| JP | 2003-318856 | 11/2003 |
| JP | 2005-102136 | 4/2005 |
| JP | 2005-184730 | 7/2005 |
| JP | 2005-252602 | 9/2005 |
| JP | 2006-14027 | 1/2006 |
| JP | 2006-186732 | 7/2006 |
| JP | 2006-238421 | 9/2006 |
| JP | 2007-150542 | 6/2007 |
| JP | 2007-208967 | 8/2007 |
| JP | 2007-221187 | 8/2007 |
| JP | 2008-199599 | 8/2008 |
| WO | WO 2006/137382 A1 | 12/2006 |

OTHER PUBLICATIONS

U.S. Appl. No. 12/551,773, filed Sep. 1, 2009, Sawai, et al.

* cited by examiner

*Primary Examiner* — Phung M Chung

(74) *Attorney, Agent, or Firm* — Oblon, Spivak, McClelland, Maier & Neustadt, L.L.P.

(57) ABSTRACT

A receiving device is provided that includes a radio receiving unit to receive radio signals transmitted from multiple transmitting antennas by multiple receiving antennas and output received signals being digital signals, a frequency control unit to detect and correct a frequency error contained in the received signals, a channel estimation unit to estimate a channel matrix of which each element corresponds to respective pair of each transmitting antenna and each receiving antenna, an equalization unit to equalize the received signals by using the estimated channel matrix, a demodulation and decoding unit to demodulate and decode the equalized received signals, and an error estimation unit to estimate a channel variation component indicating temporal variation of characteristics of each channel and a phase error component remaining in the received signals based on the channel matrix, the received signals, and a decoding result or an equalization result.

12 Claims, 5 Drawing Sheets

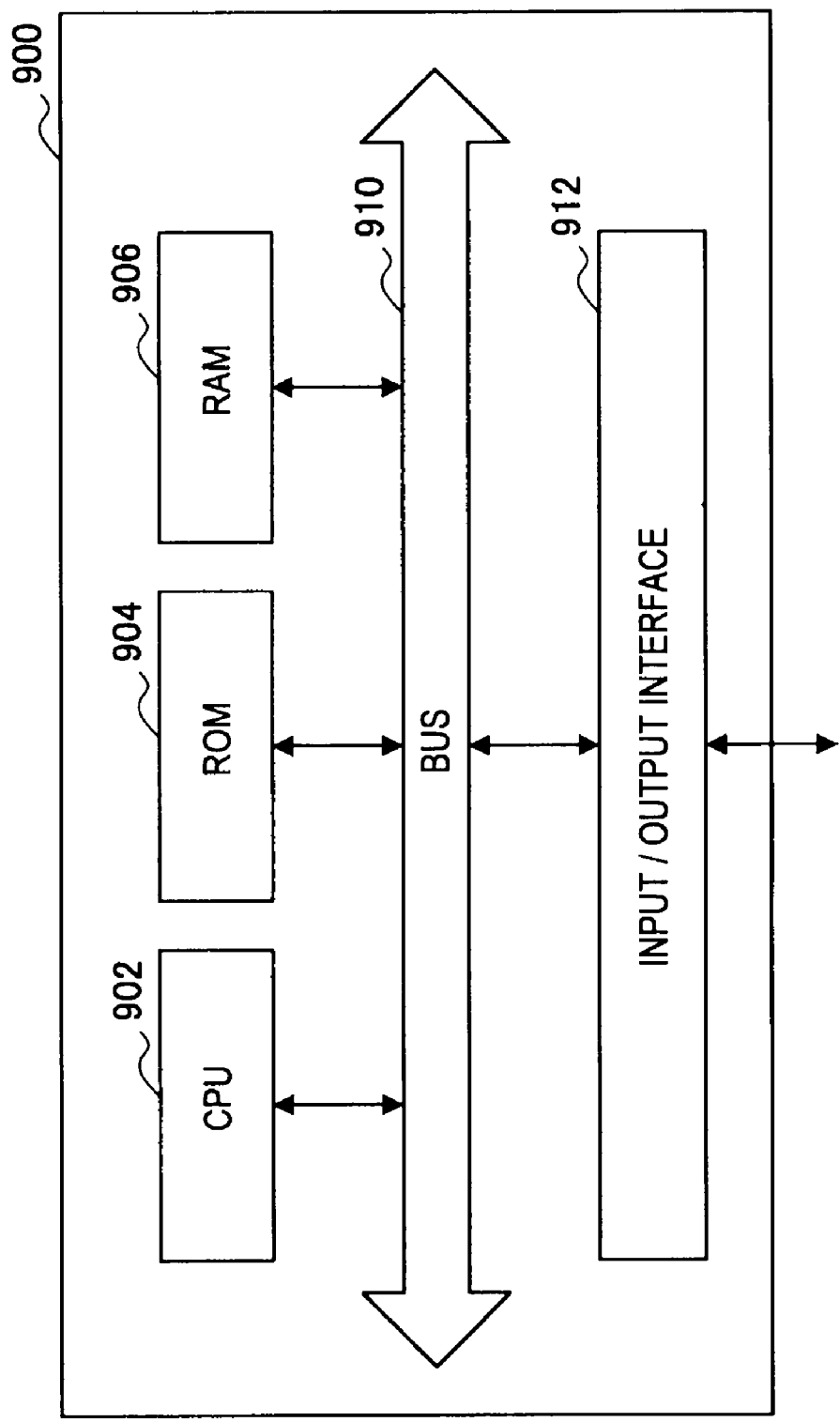

RECEIVING DEVICE, RECEIVING METHOD, PROGRAM AND WIRELESS COMMUNICATION SYSTEM

BACKGROUND OF THE INVENTION

1. Field of the Invention

The present invention relates to a receiving device, a receiving method, a program and a wireless communication system.

2. Description of the Related Art

A communication scheme called MIMO (Multiple-Input Multiple-Output) communication is in practical use today which improves the efficiency of frequency usage over a communication band by utilizing space division multiplexing. In MIMO communication, a plurality of antennas are mounted on each of a transmitting device and a receiving device, and communication is performed with use of an enlarged transmission capacity by regarding transmission paths between the respective antennas as virtual communication channels (MIMO channels) independent of one another.

In the case where M number of transmitting antennas are mounted on a transmitting device and N number of receiving antennas are mounted on a receiving device, for example, the number of virtual MIMO channels is M×N. The characteristics of M×N number of MIMO channels are typically represented as an M×N channel matrix with M number of rows and N number of columns. In MIMO communication, the receiving device estimates the M×N channel matrix by using a known signal (e.g. a preamble signal etc.) transmitted from the transmitting device and reconstructs a transmission signal from a received signal according to an estimation result.

A wireless communication system that performs MIMO communication is disclosed in Japanese Unexamined Patent Publication No. 2005-184730, for example. In Japanese Unexamined Patent Publication No. 2005-184730, a wireless communication system is proposed which eliminates the need for sequential feedback from a receiving device to a transmitting device when improving the transmission efficiency of MIMO communication with use of singular value decomposition of a channel matrix.

SUMMARY OF THE INVENTION

However, in a packet format of a wireless LAN (Local Area Network), for example, a known signal to be used for estimation of a channel matrix is placed at the head of a packet. Therefore, after estimating a channel matrix by using the known signal, the channel characteristics vary with time due to fading if a packet length is long, which causes significant degradation of the quality of received signals in some cases. Further, even with the effort to follow variation of the channel characteristics by using a pilot tone contained in a data symbol, it is difficult to follow the characteristics if a packet length is long.

In order to allow a channel matrix to adaptively follow variation of characteristics due to fading, there is a technique of calculating a new channel matrix $H_{new}$ from the previously estimated channel matrix $H_{old}$ according to the following expression (1) by using LMS (Least Mean Squares) algorithm, for example. In the expression (1), Y indicates received signals, X' indicates a result of decoding the received signals Y, $X^{'h}$ indicates a complex conjugate transposed matrix of the decoding result X', and μ indicates a forgetting factor.

[Math 1]

$$H_{new}=H_{old}+\mu\cdot(Y-H_{old}\cdot X')\cdot X^{'h}, \quad 0<\mu\leq 1.0 \qquad (1)$$

Although each element of the channel matrix H is a vector quantity subject to fading variation almost independently, even if X' can be estimated correctly, it is unable to accurately estimate temporal variation of each element of the channel matrix. Specifically, the value of an optimum forgetting factor μ applicable to an actual MIMO channel is empirically a small value (about μ=0.125), and convergence of the expression (1) is slow and it is thus difficult to immediately respond to variation of channel characteristics. Further, it is unable to correct a residual frequency offset component that remains after correcting a frequency error with use of a preamble signal, for example, by a technique hitherto used.

In light of the foregoing, it is desirable to provide a novel and improved receiving device, receiving method, program and wireless communication system having improved adaptability with temporal variation of channel characteristics of MIMO channels.

According to an embodiment of the present invention, there is provided a receiving device that includes a radio receiving unit to receive radio signals transmitted from a plurality of transmitting antennas by a plurality of receiving antennas and output received signals being digital signals, a frequency control unit to detect a frequency error contained in the received signals and correct the frequency error, a channel estimation unit to estimate a channel matrix of which each element corresponds to respective pair of each transmitting antenna and each receiving antenna, an equalization unit to equalize the received signals by using the channel matrix estimated by the channel estimation unit, a demodulation and decoding unit to demodulate and decode the received signals equalized by the equalization unit, and an error estimation unit to estimate a channel variation component indicating temporal variation of characteristics of each channel and a phase error component remaining in the received signals based on the channel matrix, the received signals, and a decoding result by the demodulation and decoding unit or an equalization result by the equalization unit.

The error estimation unit may calculate the channel variation component and the phase error component by creating a sufficient number of relational expressions between the received signals and the decoding result or the equalization result for calculating the channel variation component and the phase error component with use of a plurality of receiving symbols and solving the created relational expressions.

The error estimation unit may calculate the channel variation component and the phase error component according to a recursive least square algorithm or a least mean square algorithm with use of the channel matrix, the received signals, and the decoding result or the equalization result.

The error estimation unit may output weighted averages of the channel variation component and the phase error component calculated for a plurality of times.

The equalization unit may equalize the received signals by further using the channel variation component estimated by the error estimation unit.

The frequency control unit may further correct phases of the received signals by using the phase error component estimated by the error estimation unit.

The frequency control unit may further correct an error of a phase due to clock deviation based on the amount of change between subcarriers in the phase error component estimated by the error estimation unit.

The error estimation unit may further estimate an amplitude error component remaining in the received signals based on the channel matrix, the received signals, and the decoding result or the equalization result.

The demodulation and decoding unit may correct an amplitude of the equalization result by the equalization unit by using the amplitude error component estimated by the error estimation unit.

According to another embodiment of the present invention, there is provided a method for receiving radio signals in a receiving device, including the steps of receiving radio signals transmitted from a plurality of transmitting antennas by a plurality of receiving antennas and outputting received signals being digital signals, detecting a frequency error contained in the received signals and correcting the frequency error, estimating a channel matrix of which each element corresponds to respective pair of each transmitting antenna and each receiving antenna, equalizing the received signals by using the estimated channel matrix, demodulating and decoding the equalized received signals, and estimating a channel variation component indicating temporal variation of characteristics of each channel and a phase error component remaining in the received signals based on the channel matrix, the received signals, and a decoding result or an equalization result.

According to another embodiment of the present invention, there is provided a program causing a computer controlling a receiving device including a radio receiving unit to receive radio signals transmitted from a plurality of transmitting antennas by a plurality of receiving antennas and output received signals being digital signals, a frequency control unit to detect a frequency error contained in the received signals and correct the frequency error, a channel estimation unit to estimate a channel matrix of which each element corresponds to respective pair of each transmitting antenna and each receiving antenna, an equalization unit to equalize the received signals by using the channel matrix estimated by the channel estimation unit, and a demodulation and decoding unit to demodulate and decode the received signals equalized by the equalization unit, to function as an error estimation unit to estimate a channel variation component indicating temporal variation of characteristics of each channel and a phase error component remaining in the received signals based on the channel matrix, the received signals, and a decoding result by the demodulation and decoding unit or an equalization result by the equalization unit.

According to another embodiment of the present invention, there is provided a wireless communication system that includes a transmitting device to transmit radio signals from a plurality of transmitting antennas; and a receiving device including a radio receiving unit to receive the radio signals by a plurality of receiving antennas and output received signals being digital signals, a frequency control unit to detect a frequency error contained in the received signals and correct the frequency error, a channel estimation unit to estimate a channel matrix of which each element corresponds to respective pair of each transmitting antenna and each receiving antenna, an equalization unit to equalize the received signals by using the channel matrix estimated by the channel estimation unit, a demodulation and decoding unit to demodulate and decode the received signals equalized by the equalization unit, and an error estimation unit to estimate a channel variation component indicating temporal variation of characteristics of each channel and a phase error component remaining in the received signals based on the channel matrix, the received signals, and a decoding result by the demodulation and decoding unit or an equalization result by the equalization unit.

In the receiving device, the receiving method, the program and the wireless communication system according to the embodiments of the present invention described above, it is possible to improve adaptability with temporal variation of channel characteristics of MIMO channels.

BRIEF DESCRIPTION OF THE DRAWINGS

FIG. 5 is a block diagram showing an exemplary configuration of a computer.

DETAILED DESCRIPTION OF EMBODIMENT

Figure 1:
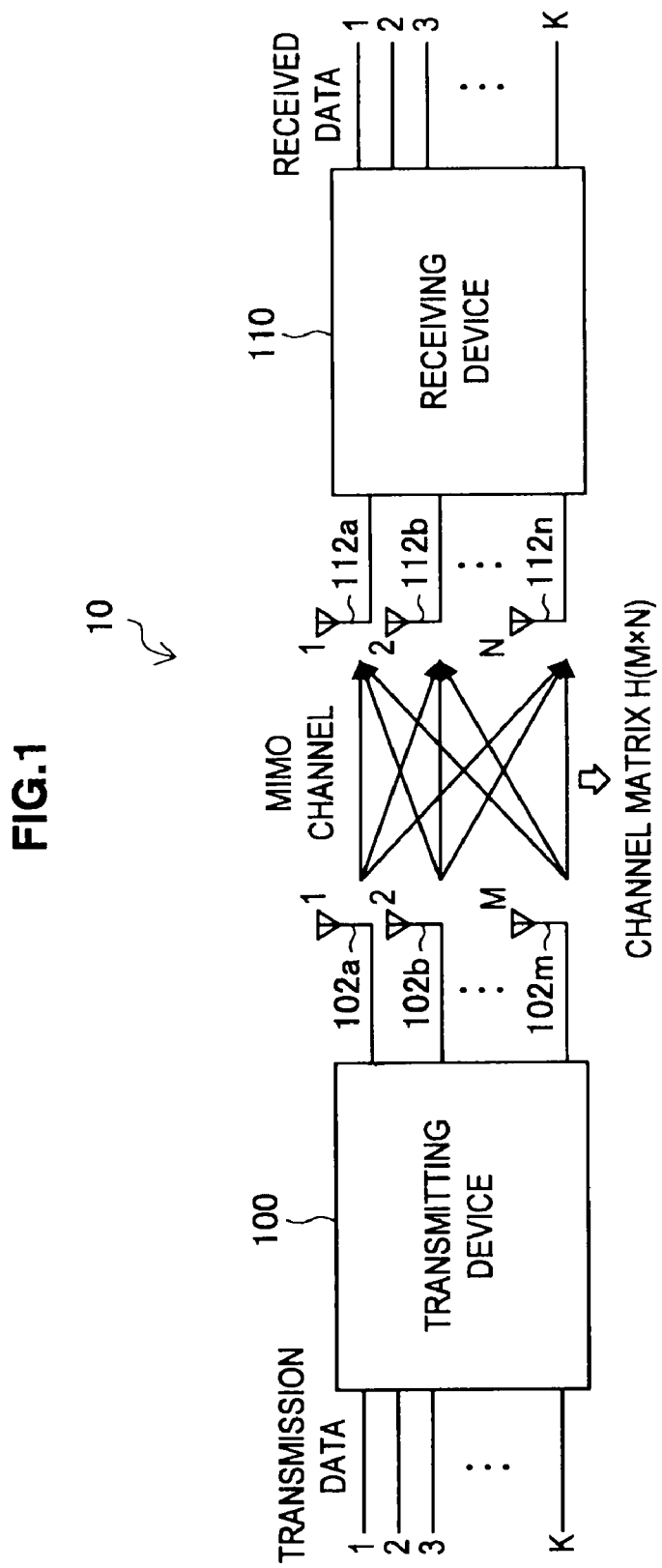
FIG. 1 is a schematic view showing a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Outline of a wireless communication system according to an embodiment
2. Explanation of a receiving device according to an embodiment
  2-1. Exemplary configuration of a receiving device
  2-2. Example of a flow of receiving processing
  2-3. First alternative example
  2-4. Second alternative example
  2-5. Third alternative example 3. Summary

1. Outline of a Wireless Communication System According to an Embodiment

The outline of a wireless communication system 10 according to an embodiment of the present invention is described hereinafter with reference to FIG. 1.

FIG. 1 is a view schematically showing the wireless communication system 10 according to an embodiment of the present invention. Referring to FIG. 1, the wireless communication system 10 includes a transmitting device 100 and a receiving device 110. The transmitting device 100 has M number of transmitting antennas 102a, 102b, . . . 102m. The receiving device 110 has N number of receiving antennas 112a, 112b, . . . , 112n.

The transmitting device 100 dispenses radio signals generated by performing space-time coding of K number of transmission data to the M number of transmitting antennas 102a, b, . . . m and sends out the signal to MIMO channels. On the other hand, the receiving device 110 receives the radio signals transmitted from the transmitting device 100 through the MIMO channels by the N number of receiving antennas 112a, b, . . . , n, performs space-time decoding and thereby obtains K number of received data.

Thus, the characteristics of communication channels (MIMO channels) in MIMO communication are represented by the M×N channel matrix H of which each element corresponds to respective pair of each of the M number of transmitting antennas of the transmitting device 100 and each of the N number of receiving antennas of the receiving device 110.

The channel matrix H is estimated in the receiving device 110 by using a known signal such as a preamble signal added at the head of a packet of a wireless LAN or a pilot signal inserted to a continuous signal at regular intervals, for example. However, as described above, after estimating the channel matrix by using the known signal, the channel characteristics vary with time due to fading if a packet length is long, which causes degradation of the quality of the received signal. In light of this, the receiving device 110 which is described as an example below is configured to readily detect temporal variation of the characteristics of MIMO channels and adaptively follow the variation. In the following description, the receiving device 110 is a receiving device that receives radio signals according to OFDM (Orthogonal Frequency Division Multiplexing) method.

Figure 2:
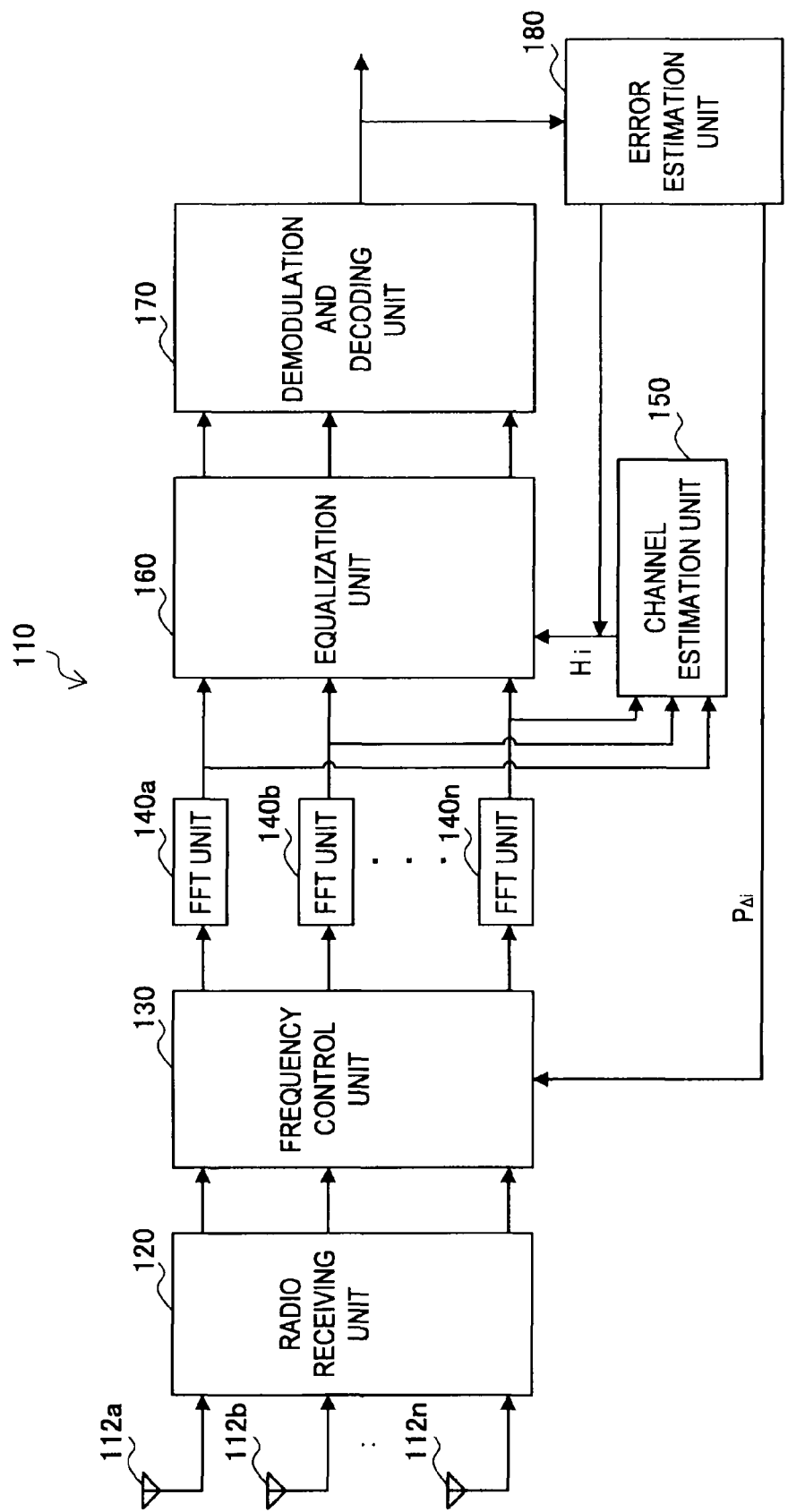
FIG. 2 is a block diagram showing a configuration of a receiving device according to an embodiment.

2. Explanation of a Receiving Device According to an Embodiment 2-1. Exemplary Configuration of a Receiving Device FIG. 2 is a block diagram showing the configuration of the receiving device 110 according to an embodiment. Referring to FIG. 2, the receiving device 110 includes N number of receiving antennas 112a, b, ..., n, a radio receiving unit 120, a frequency control unit 130, FFT units 140a, b, ..., n, a channel estimation unit 150, an equalization unit 160, a demodulation and decoding unit 170, and an error estimation unit 180.

The radio receiving unit 120 receives the radio signals transmitted from the M number of transmitting antennas 102a, b, ... m of the transmitting device 100, which is shown as an example in FIG. 1, by the N number of receiving antennas 112a, b, ..., n, generates received signals, which are digital signals, and outputs the signal to the frequency control unit 130.

Figure 3:
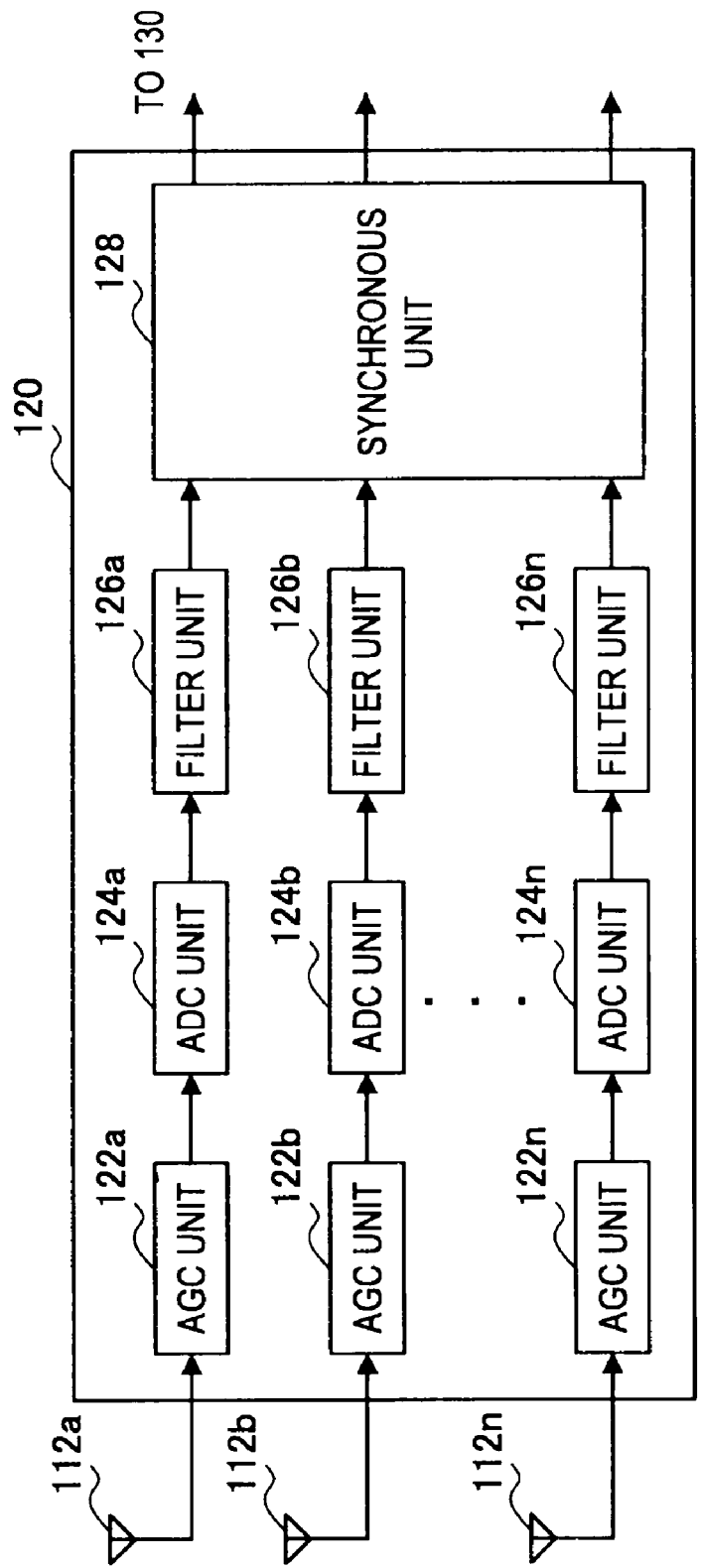
FIG. 3 is a block diagram showing a configuration of a radio receiving unit according to an embodiment.

FIG. 3 is a block diagram showing an example of a more specific configuration of the radio receiving unit 120.

Referring to FIG. 3, in the radio receiving unit 120, the N number of receiving antennas 112a, b, ..., n are respectively connected to AGC (Automatic Gain Control) units 122a, b, ... n. The AGC units 122a, b, ... n automatically control the gain of each radio signal received by the receiving antennas 112a, b, ..., n. The AGC units 122a, b, ..., n are respectively connected to ADC (Analog-Digital Converter) units 124a, b, ... n. The ADC units 124a, b, ... n respectively convert the radio signals output from the AGC units 122a, b, ... n into received signals, which are digital signals. The ADC units 124a, b, ... n are respectively connected to filter units 126a, b, ... n. The filter units 126a, b, ... n perform filtering at a given frequency on the received signals output from the ADC units 124a, b, ... n. The filter units 126a, b, ... n are connected to a synchronous unit 128. The synchronous unit 128 finds a packet, for example, from the received signals after the filtering by the filter units 126a, b, ... n and detects a synchronous timing. Then, the synchronous unit 128 outputs the received signals to the frequency control unit 130.

Referring back to FIG. 2, the configuration of the receiving device 110 according to the embodiment is further described.

The frequency control unit 130 detects a carrier frequency error contained in the received signals output from the radio receiving unit 120, corrects the detected carrier frequency error and outputs the received signals to the FFT units 140a, b, ..., n. Thus, the frequency control unit 130 implements a function of AFC (Automatic Frequency Control), for example. In this embodiment, the frequency control unit 130 further corrects phases of the received signals by using a phase error component that is estimated by the error estimation unit 180, which is described later. Estimation of the phase error component by the error estimation unit 180 is described in detail later.

The FFT (Fast Fourier Transform) units 140a, b, ..., n split the received signals in the time domain output from the radio receiving unit 120 and corrected by the frequency control unit 130 into signals for respective subcarriers in the frequency domain. The received signals split by the FFT units 140a, b, ..., n are input to the channel estimation unit 150 and the equalization unit 160.

The channel estimation unit 150 estimates the M×N channel matrix H of which element corresponds to respective pair of each transmitting antenna 102a, b, ... m and each receiving antenna 112a, b, ... n from the phase and the amplitude of the known signal contained in the received signal.

The equalization unit 160 equalizes the received signals input from the FFT units 140a, b, ..., n by using the channel matrix H estimated by the channel estimation unit 150 and thereby cancels the effect of transmission path distortion of the MIMO channels in multipath propagation environment. In this embodiment, the equalization unit 160 equalizes the received signals by further using a channel variation component that is estimated by the error estimation unit 180, which is described later. Estimation of a channel variation component by the error estimation unit 180 is described in detail later. The received signals equalized by the equalization unit 160 are output to the demodulation and decoding unit 170.

The demodulation and decoding unit 170 demodulates and decodes the equalized received signals input from the equalization unit 160. Demodulation of the received signals by the demodulation and decoding unit 170 is performed according to an arbitrary digital modulation scheme available in the wireless communication system 10, such as 16QAM (Quadrature Amplitude Modulation) or QPSK (Quadrature Phase Shift Keying). Further, at the time of decoding by the demodulation and decoding unit 170, error correction or the like may be performed at the same time, such as Viterbi decoding.

The error estimation unit 180 estimates a channel variation component indicating temporal variation of the channel matrix of MIMO channels and a phase error component remaining in the received signals based on the channel matrix, the received signals, and the decoding result by the demodulation and decoding unit 170 or the equalization result by the equalization unit 160.

A concept of estimation of the channel variation component and the phase error component by the error estimation unit 180 is described hereinbelow.

Assume, for example, the case where the number of the transmitting antennas 102 and the number of the receiving antennas 112 are both two (M=N=2). In this case, if a channel matrix for the i-th symbol is $H_i$, an initial value $H_o$ of the channel matrix is defined as the following expression (2).

[Math 2]

$$H_0 = \begin{bmatrix} h_{00,0} & h_{01,0} \\ h_{10,0} & h_{11,0} \end{bmatrix} \qquad (2)$$

Further, if a channel variation component by fading is $Be^{j\Delta}$ (B indicates amplitude variation, and $e^{j\Delta}$ indicates phase variation), the channel matrix $H_i$ affected by fading after i>0 is defined as the following expression (3).

[Math 3]

$$H_i = \begin{bmatrix} h_{00,i-1} \cdot (B_{00} e^{j\Delta_{00}})_i & h_{01,i-1} \cdot (B_{01} e^{j\Delta_{01}})_i \\ h_{10,i-1} \cdot (B_{10} e^{j\Delta_{10}})_i & h_{11,i-1} \cdot (B_{11} e^{j\Delta_{11}})_i \end{bmatrix} \quad (3)$$

In this case, values to be estimated by the channel estimation unit 150 are four channel variation components $B_{00}e^{j\Delta_{00}}$, $B_{01}e^{j\Delta_{01}}$, $B_{10}e^{j\Delta_{10}}$ and $B_{11}e^{j\Delta_{11}}$. If the received signals for the i-th symbol is $Y_i$, and a decoding result by the demodulation and decoding unit 170 or an equalization result by the equalization unit 160 (e.g. a value obtained by hard decision of an equalization result) is $X'_i$, the following relational expression is established by using the channel matrix H.

[Math 4]

$$Y_i = H_i \cdot X'_i \quad (4)$$

If the expression (4) is decomposed in vector element units, the following two simultaneous equations are derived.

[Math 5]

$$y_{0,i} = h_{00,i-1} \cdot (B_{00}e^{j\Delta_{00}})_i \cdot x_{0,i} + h_{01,i-1} \cdot (B_{01}e^{j\Delta_{01}})_i \cdot x_{1,i} \quad (5)$$

$$y_{1,i} = h_{10,i-1} \cdot (B_{10}e^{j\Delta_{10}})_i \cdot x_{0,i} + h_{11,i-1} \cdot (B_{11}e^{j\Delta_{11}})_i \cdot x_{1,i} \quad (6)$$

Further, for the i+1th symbol, the following two simultaneous equations are derived.

[Math 6]

$$y_{0,i+1} = h_{00,i-1} \cdot ((B_{00}+B'_{00})e^{j(\Delta_{00}+\Delta'_{00})})_i \cdot x_{0,1+1} + h_{01,i-1} \cdot ((B_{01}+B'_{01})e^{j(\Delta_{01}+\Delta'_{01})})_i \cdot x_{1,i+1} \quad (7)$$

$$y_{1,i+1} = h_{10,i-1} \cdot ((B_{10}+B'_{10})e^{j(\Delta_{10}+\Delta'_{10})})_i \cdot x_{0,1+1} + h_{11,i-1} \cdot ((B_{11}+B'_{11})e^{j(\Delta_{11}+\Delta'_{11})})_i \cdot x_{1,i+1} \quad (8)$$

If it is assumed that a difference B' in channel variation component between symbols and $e^{j\Delta'}$ are sufficiently small, the expressions (7) and (8) can be simplified into the following expressions (9) and (10).

[Math 7]

$$y_{0,i+1} = h_{00,i-1} \cdot ((B_{00})e^{j\Delta_{00}}) \cdot x_{0,i+1} + h_{01,i-1} \cdot ((B_{01})e^{j\Delta_{01}})_i \cdot x_{1,i+1} \quad (9)$$

$$y_{10,i+1} = h_{10,i-1} \cdot ((B_{00})e^{j\Delta_{10}}) \cdot x_{0,i+1} + h_{11,i-1} \cdot ((B_{11})e^{j\Delta_{11}})_i \cdot x_{1,i+1} \quad (10)$$

As described above, four relational expressions (5), (6), (9) and (10) are derived for the four channel variation components $B_{00}e^{j\Delta_{00}}$, $B_{01}e^{j\Delta_{01}}$, $B_{10}e^{j\Delta_{10}}$ and $B_{11}e^{j\Delta_{11}}$, $B_{00,i-1}$, $B_{01,i-1}$, $B_{10,i-1}$ and $B_{11}e^{j\Delta_{11}}$ that appear in the relational expressions are elements of the channel matrix $H_{i-1}$ that is estimated for the i−1th symbol which is received in the past. Thus, the above four channel variation components $B_{00}e^{j\Delta_{00}}$, $B_{01}e^{j\Delta_{01}}$, $B_{10}e^{j\Delta_{10}}$ and $B_{11}e^{j\Delta_{11}}$ can be obtained by solving the simultaneous equations by using the known channel matrix H, the received signals Y and the decoding result or the equalization result X'.

In addition to the channel variation component due to fading, the error estimation unit 180 according to the embodiment further estimates the phase error component that remains in the received signals after correction of the carrier frequency error by the frequency control unit 130.

First, the phase error component remaining in the received signals can be divided into an error component $P_i$ obtained from a pilot channel in the process of decoding a symbol and a residual frequency offset component $P_{\Delta i}$ due to a frequency offset in the frequency control unit 130. The error component $P_i$ is a known value that is obtained from a pilot channel in the process of symbol decoding. The error component $P_i$ is represented by the following expression (11).

[Math 8]

$$P_i = e^{j\theta_i} \quad (11)$$

On the other hand, the residual frequency offset component $P_{\Delta i}$ is an unknown value. The residual frequency offset component $P_{\Delta i}$ is represented by the following expression (12).

[Math 9]

$$P_{\Delta i} = e^{j\Delta_e} \quad (12)$$

The relational expression of the received signals $Y_i$, the decoding result or the equalization result X', the channel matrix $H_i$, the error component $P_i$ and the residual frequency offset component $P_{\Delta i}$ for the i-th symbol is given by the following expression (13), by extending the above-described expression (4).

[Math 10]

$$Y_i = H_i \cdot X'_i \cdot P_i \cdot P_{\Delta i} \quad (13)$$

Because the residual frequency offset component $P_{\Delta i}$ is a phase that rotates for every symbol, the following expressions (14) to (19) are derived in consideration of the i-th, i+1th and i+2th symbols.

[Math 11]

$$y_{0,i} = h_{00,i-1} \cdot (B_{00}e^{j\Delta_{00}})_i \cdot x_{0,i} \cdot e^{j(\theta_i+\Delta_e)} + h_{01,i-1} \cdot (B_{01}e^{j\Delta_{01}})_i \cdot x_{1,i} \cdot e^{j(\theta_i+\Delta_e)} \quad (14)$$

$$y_{1,i} = h_{10,i-1} \cdot (B_{10}e^{j\Delta_{10}})_i \cdot x_{0,i} \cdot e^{j(\theta_i+\Delta_e)} + h_{11,i-1} \cdot (B_{11}e^{j\Delta_{11}})_i \cdot x_{1,i} \cdot e^{j(\theta_i+\Delta_e)} \quad (15)$$

$$y_{0,i+1} = h_{00,i-1} \cdot (B_{00}e^{j\Delta_{00}})_i \cdot x_{0,i+1} \cdot e^{j(\theta_{i+1}+2\Delta_e)} + h_{01,i-1} \cdot (B_{01}e^{j\Delta_{01}})_i \cdot x_{1,i+1} \cdot e^{j(\theta_{i+1}+2\Delta_e)} \quad (16)$$

$$y_{1,i+1} = h_{10,i-1} \cdot (B_{10}e^{j\Delta_{10}})_i \cdot x_{0,i+1} \cdot e^{j(\theta_{i+1}+2\Delta_e)} + h_{11,i-1} \cdot (B_{11}e^{j\Delta_{11}})_i \cdot x_{1,i+1} \cdot e^{j(\theta_{i+1}+2\Delta_e)} \quad (17)$$

$$y_{0,i+2} = h_{00,i-1} \cdot (B_{00}e^{j\Delta_{00}})_i \cdot x_{0,i+2} \cdot e^{j(\theta_{i+2}+2\Delta_e)} + h_{01,i-1} \cdot (B_{01}e^{j\Delta_{01}})_i \cdot x_{1,i+2} \cdot e^{j(\theta_{i+2}+3\Delta_e)} \quad (18)$$

$$y_{1,i+2} = h_{00,i-1} \cdot (B_{10}e^{j\Delta_{10}})_i \cdot x_{0,i+2} \cdot e^{j(\theta_{i+2}+3\Delta_e)} + h_{11,i-1} \cdot (B_{11}e^{j\Delta_{11}})_i \cdot x_{1,i+2} \cdot e^{j(\theta_{i+2}+2\Delta_e)} \quad (19)$$

In the above six relational expressions (14) to (19), there are five unknown variables, the four channel variation components $B_{00}e^{j\Delta_{00}}$, $B_{01}e^{j\Delta_{01}}$, $B_{10}e^{j\Delta_{10}}$ and $B_{11}e^{j\Delta_{11}}$ and the residual frequency offset component $P_{\Delta i}$. Thus, it is possible to estimate not only the above four channel variation components $B_{00}e^{j\Delta_{00}}$, $B_{01}e^{j\Delta_{01}}$, $B_{10}e^{j\Delta_{10}}$ and $B_{11}e^{j\Delta_{11}}$ but also the residual frequency offset component $P_{\Delta i}$ by using the known channel matrix H, the received signals Y and the decoding result or the equalization result X'. Although the above explanation is given by using 2×2 MIMO channels as an example, if the order of the MIMO channels is larger, a sufficient number of relational expressions for calculating the channel variation component and the phase error component can be prepared by increasing the number of symbols to be considered.

The error estimation unit 180 may calculate the channel variation component and the residual frequency offset component by obtaining the solution of the simultaneous equations after generating the above six relational expressions (14) to (19), for example. Alternatively, the error estimation unit 180 may calculate the channel variation component and the residual frequency offset component by applying a known RLS (Recursive Least Square) algorithm or LMS (Least Mean Square) algorithm.

If a deviation of a frequency remains after correction of a carrier frequency error by the frequency control unit 130, orthogonal deviation remains in the signals for the respective subcarriers split by the FFT units 140a, b, ..., n, which causes interference between subcarriers. In light of this, in this embodiment, the residual frequency offset component $P_{\Delta i}$ calculated by the error estimation unit 180 is fed back to the frequency control unit 130 as shown in FIG. 2. Then, the frequency control unit 130 further corrects the phase of the received signals by using the residual frequency offset component $P_{\Delta i}$ as the phase error component and outputs the received signals to the FFT units 140a, b, ..., n.

Further, a new channel matrix H, more suitably adapted to temporal variation of channel characteristics may be calculated according to the expression (3) by using the channel variation component calculated by the error estimation unit 180. In this embodiment, the equalization unit 160 acquires such a channel matrix H, from the error estimation unit 180 and uses it for equalization of the received signals input from the FFT units 140a, b, ..., n.

2-2. Example of a Flow of Receiving Processing

The configuration of the receiving device 110 according to the embodiment is described in the foregoing with reference to FIGS. 1 to 3. In the following, the flow of receiving processing by the receiving device 110 is described with reference to FIG. 4.

Figure 4:
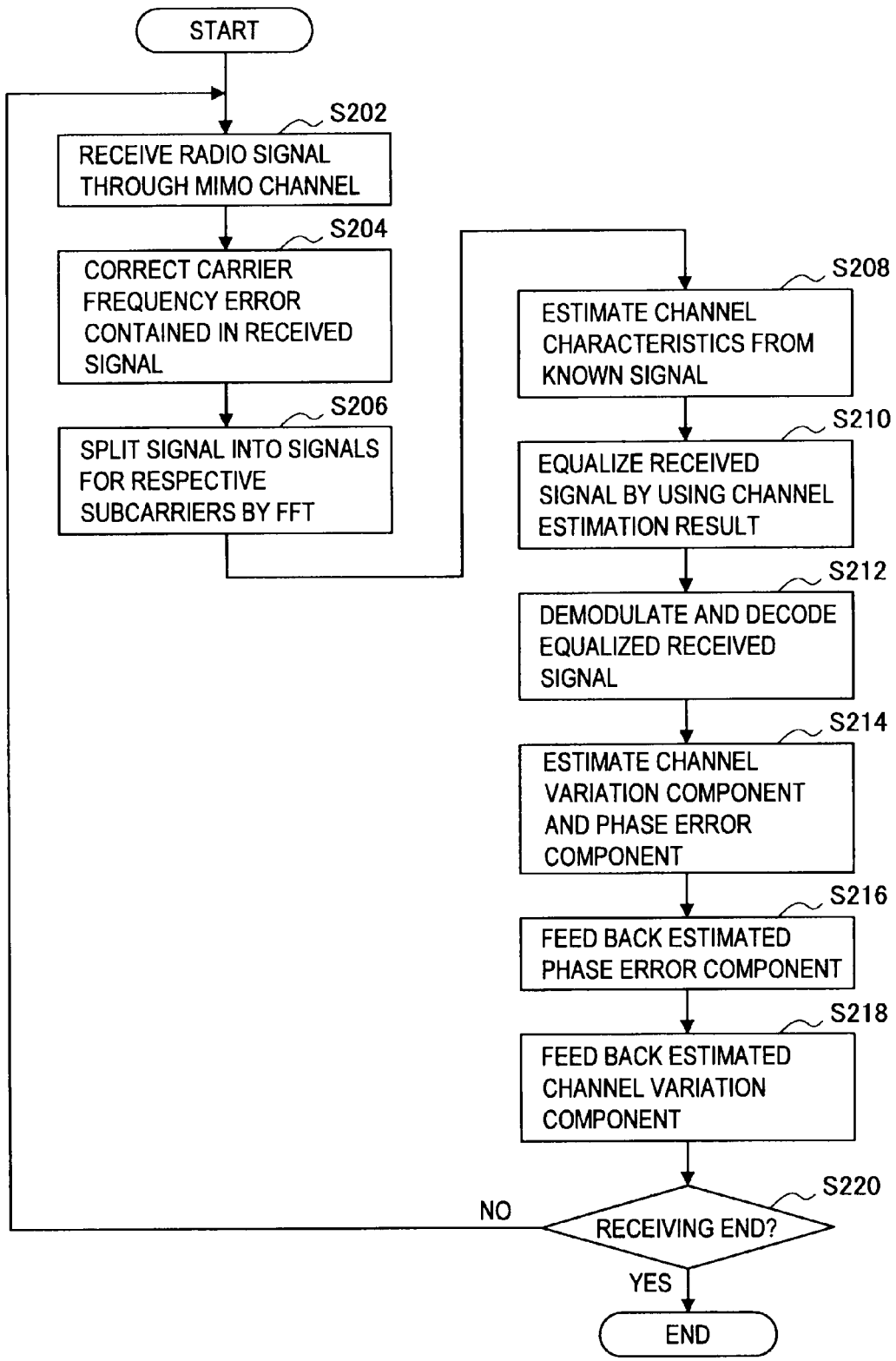
FIG. 4 is a flowchart showing a flow of receiving processing according to an embodiment.

FIG. 4 is a flowchart showing an example of a flow of receiving processing of radio signals by the receiving device 110 according to the embodiment.

In FIG. 4, the radio receiving unit 120 first receives radio signals transmitted from the transmitting device 100 through MIMO channels by using the receiving antennas 112a, b, ..., n and outputs received signals, which are digital signals (S202).

Next, the frequency control unit 130 detects a carrier frequency error contained in the received signals and corrects the carrier frequency error (S204).

Then, the FFT units 140a, b, ..., n split the received signals in the time domain whose frequency error is corrected into signals for respective subcarriers in the frequency domain (S206). The received signals split by the FFT units 140a, b, ..., n is output to the channel estimation unit 150 and the equalization unit 160.

After that, the channel estimation unit 150 estimates a channel matrix H representing the characteristics of the MIMO channels by using a known signal contained in the received signals, for example (S208).

Then, the equalization unit 160 equalizes the received signals by using the channel matrix H as a channel estimation result by the channel estimation unit 150 (S210).

Then, the demodulation and decoding unit 170 demodulates and decodes the equalized received signals (S212). The signal decoded by the demodulation and decoding unit 170 is output as a data signal to a host device and also output to the error estimation unit 180.

The error estimation unit 180 then estimates a channel variation component and a phase error component based on the channel matrix, the received signals, and the decoding result by the demodulation and decoding unit 170 or the equalization result by the equalization unit 160 (S214).

After that, a residual frequency offset as the phase error component estimated by the error estimation unit 180 is fed back to the frequency control unit 130 (S216) and used for correction of a frequency error of a signal to be processed next.

Further, the channel variation component estimated by the error estimation unit 180 is fed back to the equalization unit 160 as a value to be used for calculation of a new channel matrix H (S218).

After that, if a signal to be processed is left, the process returns to S202 and repeats the steps from S202 to S218 by using the channel variation component and the phase error component estimated by the error estimation unit 180 (S220). On the other hand, if a signal to be processed is not left, receiving processing by the receiving device 110 ends.

An example of the flow of receiving processing by the receiving device 110 is described in the foregoing with reference to FIG. 4. A part of receiving processing (e.g. error estimation processing etc.) by the receiving device 110 may be implemented by using software. If the whole or part of processing is executed by software, a program constituting the software is executed by using a computer incorporated into dedicated hardware or a computer 900 shown in FIG. 5, for example.

In FIG. 5, a CPU (Central Processing Unit) 902 controls the overall operation of the computer 900. ROM (Read Only Memory) 904 stores a program constituting software, data or the like. RAM (Random Access Memory) 906 temporarily stores a program, data or the like to be used by the CPU 902 during execution of processing. ROM 904 and RAM 906 are exemplary computer readable mediums.

The CPU 902, the ROM 904 and the RAM 906 are connected to an input/output interface 912 through a bus 910. The input/output interface 912 is an interface for inputting and outputting commands or information to and from the outside of the computer 900.

Hereinafter, alternative examples that can be implemented by applying the configuration of the receiving device 110 described in the foregoing are described.

2-3. First Alternative Example

If the receiving device 110 receives radio signals by OFDM, the phase error component has an inclination corresponding to a subcarrier frequency in signals for respective subcarriers split by the FFT units 140a, b, ..., n in some cases. The inclination of the phase error component can occur caused by clock deviation in the receiving device 110, for example. In light of this, the frequency control unit 130 may calculate the amount of change between subcarriers in the phase error component output from the error estimation unit 180 and may correct the phase error due to clock deviation based on the inclination according to the subcarrier frequency determined from the amount of change. It is thereby possible to prevent degradation of the quality of the received signals upon occurrence of clock deviation.

2-4. Second Alternative Example

Further, in the receiving device 110, an error can occur not only in the phase but also the amplitude of received signals caused by incompleteness of an RF (Radio Frequency) circuit, distortion of MIMO channels or the like. In light of this, a parameter $B_e$ for estimating an amplitude error component may be used as in the following expression (20), in stead of the above-described expression (13).

[Math 12]

$$Y_i = B_e \cdot H_i \cdot X'_i \cdot P_{\Delta i} \qquad (20)$$

In this case, the error estimation unit 180 may create a sufficient number of relational expressions for calculating the amplitude error component $B_e$ (and the channel variation component and the phase error component) for a plurality of symbols as shown in the expressions (14) to (19) and calculate the amplitude error component $B_e$ from the relational expressions.

The amplitude error component $B_e$ calculated by the error estimation unit 180 is fed back to the demodulation and decoding unit 170, for example. Then, the demodulation and decoding unit 170 can correct the amplitude of the equalized received signals input from the equalization unit 160 by using the fed-back amplitude error component $B_e$.

2-5. Third Alternative Example

Further, the error estimation unit 180 may calculate the channel variation component and the phase error component for a plurality of times and then calculate a weighted average of the calculated channel variation components and that of phase error components, thereby enhancing the accuracy of an estimation result of each component. In this case, the error estimation unit 180 may temporarily store the calculated channel variation components and phase error components by a certain number of times into internal memory of the receiving device 110, for example, and then acquire the channel variation components and the phase error components of a plurality of times from the memory and calculate the weighted averages. The weighted averages calculated by the error estimation unit 180 are output to the frequency control unit 130 and the equalization unit 160, for example, to be used for highly accurate phase error correction or equalization of the received signal.

3. Summary

The wireless communication system 10 according to the embodiment of the present invention is described, mainly about the configuration of the receiving device 110, with reference to FIGS. 1 to 5. According to this embodiment, the channel variation component corresponding to temporal variation of MIMO channels is estimated in the error estimation unit 180 with use of the decoding result by the demodulation and decoding unit 170 or the equalization result by the equalization unit 160 and reflected on the channel matrix. Therefore, even if a packet length is long, the adaptability with temporal variation of channel characteristics due to fading, for example, is improved.

Further, according to the embodiment, the phase error component that remains after correcting the carrier frequency error by the frequency control unit 130 is also estimated in the error estimation unit 180 and fed back to the frequency control unit 130. Therefore, the phase error caused by residual frequency offset, clock deviation or the like is corrected appropriately by the frequency control unit 130. Consequently, interference between subcarriers due to orthogonal deviation or the like in the FFT units 140, for example, is prevented, thus further enhancing the quality of communication service in the receiving device 110.

The transmitting device 100 and the receiving device 110 according to an embodiment described above may be a wireless communication device such as a mobile phone terminal or a portable information terminal or an information processing device such as a PC (Personal Computer) or a home information appliance, for example. Alternatively, the transmitting device 100 and the receiving device 110 according to an embodiment may be a wireless communication module or the like incorporated into each device described above, for example.

It should be understood by those skilled in the art that various modifications, combinations, sub-combinations and alterations may occur depending on design requirements and other factors insofar as they are within the scope of the appended claims or the equivalents thereof.

For example, it is not always necessary to perform the receiving processing according to an embodiment described with reference to FIG. 4 according to the sequence shown in the flowchart. For example, each processing step may include processing performed in parallel or individually.

The present application contains subject matter related to that disclosed in Japanese Priority Patent Application JP 2008-264109 filed in the Japan Patent Office on Oct. 10, 2008, the entire content of which is hereby incorporated by reference.

What is claimed is:

1. A receiving device comprising:
a radio receiving unit configured to receive radio signals transmitted from a plurality of transmitting antennas using a plurality of receiving antennas and to output the received signals as digital signals;
a frequency control unit configured to detect a frequency error contained in the received signals and to correct the frequency error;
a channel estimation unit configured to estimate a channel matrix, of which each element corresponds to a respective pair of a transmitting antenna and a receiving antenna, the transmitting antenna and the receiving antenna each being one of the pluralities of transmitting antennas and receiving antennas;
an equalization unit configured to equalize the error corrected received signals by using the channel matrix estimated by the channel estimation unit;
a demodulation and decoding unit configured to demodulate and decode the received signals equalized by the equalization unit; and
an error estimation unit configured to estimate a channel variation component indicating temporal variation of characteristics of each channel and a phase error component indicating phase error remaining in the received signals following frequency error correction by the frequency control unit, wherein
the estimation is based on a relational expression that includes the estimated channel matrix, the received signals, and a decoding result by the demodulation and decoding unit or an equalization result by the equalization unit.

2. The receiving device according to claim 1, wherein
the error estimation unit calculates the channel variation component and the phase error component by creating a sufficient number of relational expressions between the received signals and the decoding result or the equalization result for calculating the channel variation component and the phase error component with use of a plurality of receiving symbols and solving the created relational expressions.

3. The receiving device according to claim 1, wherein
the error estimation unit calculates the channel variation component and the phase error component according to a recursive least square algorithm or a least mean square algorithm with use of the estimated channel matrix, the received signals, and the decoding result or the equalization result.

4. The receiving device according to claim 1, wherein the error estimation unit outputs weighted averages of the channel variation component and the phase error component calculated for a plurality of times.

5. The receiving device according to claim 1, wherein the equalization unit equalizes the received signals by further using the channel variation component estimated by the error estimation unit.

6. The receiving device according to claim 1, wherein the frequency control unit further corrects phases of the received signals by using the phase error component estimated by the error estimation unit.

7. The receiving device according to claim 1, wherein the frequency control unit further corrects an error of a phase due to clock deviation based on an amount of change between subcarriers in the phase error component estimated by the error estimation unit.

8. The receiving device according to claim 1, wherein the error estimation unit further estimates an amplitude error component of the received signals based on a relational expression that includes the channel matrix, the received signals, and the decoding result or the equalization result.

9. The receiving device according to claim 8, wherein the demodulation and decoding unit corrects an amplitude of the equalization result by the equalization unit by using the amplitude error component estimated by the error estimation unit.

10. A method for receiving radio signals in a receiving device, comprising the steps of:
receiving radio signals transmitted from a plurality of transmitting antennas using a plurality of receiving antennas and outputting the received signals as digital signals;
detecting a frequency error contained in the received signals and correcting the frequency error;
estimating a channel matrix, of which each element corresponds to a respective pair of a transmitting antenna and a receiving antenna, the transmitting antenna and the receiving antenna each being one of the pluralities of transmitting antennas and receiving antennas;
equalizing the error corrected received signals by using the estimated channel matrix estimated by the channel estimation unit;
demodulating and decoding the equalized received signals; and
estimating a channel variation component indicating temporal variation of characteristics of each channel and a phase error component indicating phase error remaining in the received signals following frequency error correction, wherein
the estimation is based on a relational expression that includes the estimated channel matrix, the received signals, and a decoding result or an equalization result.

11. A non-transitory computer readable medium having instructions stored therein that when executed by a processing circuit controlling a receiving device, the receiving device comprising:
a radio receiving unit configured to receive radio signals transmitted from a plurality of transmitting antennas using a plurality of receiving antennas and to output the received signals as digital signals;
a frequency control unit configured to detect a frequency error contained in the received signals and to correct the frequency error;
a channel estimation unit configured to estimate a channel matrix, of which each element corresponds to a respective pair of a transmitting antenna and a receiving antenna, the transmitting antenna and the receiving antenna each being one of the pluralities of transmitting antennas and receiving antennas;
an equalization unit configured to equalize the error corrected received signals by using the channel matrix estimated by the channel estimation unit; and
a demodulation and decoding unit configured to demodulate and decode the received signals equalized by the equalization unit,
causes the processing circuit to function as an error estimation unit configured to estimate a channel variation component indicating temporal variation of characteristics of each channel and a phase error component indicating phase error remaining in the received signals following frequency error correction by the frequency control unit, wherein
the estimation is based on a relational expression that includes the estimated channel matrix, the received signals, and a decoding result by the demodulation and decoding unit or an equalization result by the equalization unit.

12. A wireless communication system comprising:
a transmitting device configured to transmit radio signals from a plurality of transmitting antennas; and
a receiving device including:
a radio receiving unit configured to receive the radio signals using a plurality of receiving antennas and to output the received signals as digital signals,
a frequency control unit configured to detect a frequency error contained in the received signals and to correct the frequency error,
a channel estimation unit configured to estimate a channel matrix, of which each element corresponds to a respective pair of a transmitting antenna and a receiving antenna, the transmitting antenna and the receiving antenna each being one of the pluralities of transmitting antennas and receiving antennas,
an equalization unit configured to equalize the error corrected received signals by using the channel matrix estimated by the channel estimation unit,
a demodulation and decoding unit configured to demodulate and decode the received signals equalized by the equalization unit, and
an error estimation unit configured to estimate a channel variation component indicating temporal variation of characteristics of each channel and a phase error component indicating phase error remaining in the received signals following frequency error correction by the frequency control unit, wherein
the estimation is based on a relational expression that includes the estimated channel matrix, the received signals, and a decoding result by the demodulation and decoding unit or an equalization result by the equalization unit.

* * * * *